(12) United States Patent
Courtois et al.

(10) Patent No.: US 6,257,939 B1
(45) Date of Patent: Jul. 10, 2001

(54) INSERT FOR FIXING AN ELECTRICAL CONNECTOR TO A THIN WALL

(75) Inventors: Alain Courtois; Jean-Pierre Huet, both of Blois (FR)

(73) Assignee: Societe Anonyme Dubuis, Blois Cedex (FR)

(*) Notice: Subject to any disclaimer, the term of this patent is extended or adjusted under 35 U.S.C. 154(b) by 0 days.

(21) Appl. No.: 09/083,848

(22) Filed: May 26, 1998

(30) Foreign Application Priority Data

May 23, 1997 (FR) .................................... 97 06295

(51) Int. Cl.[7] .................................... H01R 13/415
(52) U.S. Cl. ............................ 439/801; 439/741
(58) Field of Search ..................... 439/801, 100, 439/741

(56) References Cited

U.S. PATENT DOCUMENTS 2,248,845   7/1941   Beam .................................... 173/283
4,552,424 * 11/1985  Seaquiist et al. .................... 439/801

FOREIGN PATENT DOCUMENTS 0575259   12/1993   (EP) .
0677419   10/1995   (EP) .

* cited by examiner

Primary Examiner—Gary F. Paumen
(74) Attorney, Agent, or Firm—Greenblum & Bernstein, P.L.C.

(57) ABSTRACT

An insert for the binding of an electric connector terminal to a thin wall, and the methods for mounting and dismounting same. An insert according to the invention is constituted of a metallic pin, provided with a truncated head and a threaded extension, and a non-split metallic ring which is provided with at least one retaining shoulder, the pin head being adapted to be threaded into the ring on the side opposite of its retaining shoulder, whereas the assembly is provided to be introduced into a bore P made in the wall, while the terminal is integral with the ring or fixed between the ring and a nut screwed onto the threaded extension of the pin, whereas the insert is remarkable in that the interior bore of the ring is initially cylindrical, and the longitudinal dimension thereof, from its free end to its retaining shoulder, is distinctly greater than the thickness of the wall, so that the part extending past the wall, on the side of the truncated pin head, deforms itself by flaring out during the penetration of the pin head into the ring.

16 Claims, 4 Drawing Sheets

INSERT FOR FIXING AN ELECTRICAL CONNECTOR TO A THIN WALL

BACKGROUND OF THE INVENTION

1. Field of the Invention

The present invention relates to an insert for fixing of an electric connector terminal to a thin wall, and to the methods for mounting and dismounting same.

2. Description of Background and Material Information

It is especially known from the co-owned European Patent No. 0 575 259 to fix a terminal, for example, into the core of a rail of a railway, by means of an insert which is generally constituted of a metallic pin, provided with a truncated head and a threaded extension, and of a non-split metallic ring which is provided with at least a retaining shoulder, the pin head being adapted to be threaded into the ring, on the side opposite its retaining shoulder, whereas the assembly is provided to be introduced into a bore made in the wall, while the terminal is integral with the ring or fixed between the ring and a nut screwed onto the threaded extension of the pin.

This prior art relates to fixing a terminal on a relatively thick wall, and the binding is obtained by expansion of the ring which specifically has, to this end, a substantially truncated bore, whereas the shoulder is a flange that is additionally provided with an annular groove.

For an electric connector, the advantages of a non-split ring were disclosed in the aforementioned patent (better contact, sealing . . . ).

It is readily understandable that such an insert is not particularly well adapted to a thin wall, as the thickness thereof would not allow sufficient expanding of the ring.

SUMMARY OF THE INVENTION

Therefore, an object of the invention is to provide a new insert which retains the advantages of the aforementioned insert but adapts better to thin walls.

To this end, the insert is generally of the aforementioned type but it is remarkable and differs from this known art in that the internal bore of the ring is initially cylindrical, and that the longitudinal dimension thereof, from its free end to its retaining shoulder, is distinctly greater than the thickness of the wall, so that the part extending past the wall, on the side of the truncated pin head, deforms itself by flaring out during the penetration of the pin head into the ring.

According to an interesting but non-limiting embodiment, the ring has a stepped double shoulder, the first is used as a retaining shoulder of the ring on the wall, and the second, called an extracting shoulder, allows ensuring a grip by an extracting tool on the ring.

The retaining shoulder of the ring can also be provided with an annular groove provided in the area of its connection with the external surface of the ring.

The pin is, for example, made of stainless steel and the ring of tinned copper while the pin and the ring are advantageously assembled together before use.

The invention also proposes, on the one hand, a method for mounting such an insert into a wall, which is remarkable in that it provide for making a bore in the wall and marking the internal peripheral surface of the bore by forming serrations, of introducing the insert into the bore until the retaining shoulder of the ring comes into contact with the wall, then of exerting a traction on the rod of the pin to cause a diametrical expansion of the ring during penetration of the pin, and on the other hand, a method for dismounting, which is remarkable in that it provides, after having unscrewed the nut and laid the terminal when needed, of removing the pin from the ring by striking on the end opposite its truncated head, of drilling the ring to increase its internal diameter so as to reduce the thickness and thus its resistance, then of removing the ring.

For dismounting an insert provided with a double shoulder as previously specified, the ring can also be extracted by utilizing a tool which takes support on the wall while gripping the extracting shoulder.

BRIEF DESCRIPTION OF DRAWINGS

The invention will be understood well and other particularities will appear when reading the following description which refers to the annexed drawings in which.

DETAILED DESCRIPTION OF THE INVENTION

Figure 1:
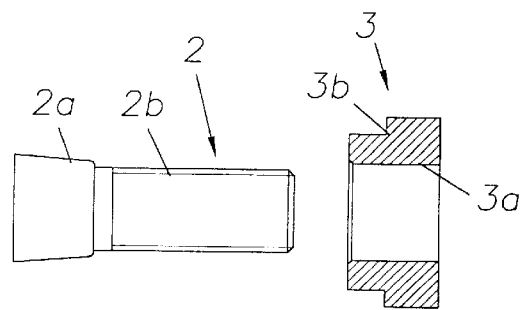
FIG. 1 shows an insert according to the invention, the two constitutive pieces of which are separated.

The insert 1 according to the invention utilizing a metallic pin 2 (for example, made of stainless steel) and a ring 3 made of a copper alloy (for example, tinned copper) or another appropriate metal. For clarity, the same reference 3 is maintained for the ring in the embodiments of FIGS. 1–3 and 4–6 respectively, since the ring differs from one embodiment to the other only by complementary mechanisms.

The pin 2 has a truncated head 2a and an extension in the form of an externally threaded cylindrical rod 2b.

The ring 3 (FIGS. 1, 2 and 4, 5) which is non-split and has here an external cylindrical form, includes an internal cylindrical bore 3a.

The external part of the ring 3 includes a shoulder 3b, called a retaining shoulder.

In the non-limiting embodiment, shown in FIGS. 4–6 and 11–13, the shoulder 3b of the ring 3 is followed by a second shoulder 3c forming a step, and the shoulder 3b is also provided with an annular groove 3d provided in the area of its connection with the external cylindrical surface of the ring 3.

The annular groove 3d especially provides a better expansion of the ring 3 as described in prior patent EP-0 575 259, while the shoulder 3c allows for an extracting of the ring, as will be explained hereafter.

As can be seen in the drawings, the retaining shoulder 3b extends circumferentially around the ring 3 and projects longitudinally along the ring a predetermined amount in a direction toward the free end of the ring, i.e., toward the left in the figures. In the embodiments which include the second, or extraction, shoulder 3c, the extraction shoulder extends around the ring, as well, and it projects longitudinally in the same direction, only to a lesser extent, thereby forming a step, providing a gripping surface for a ring extraction tool, as will be explained hereinafter.

In the embodiment of the aforementioned FIGS. 4–6 and 11–13, the ring 3 therefore has a second shoulder 3c and a groove 3d, but it is clear that an embodiment provided only with a groove 3d, without a second shoulder, or yet an embodiment provided only with a second shoulder 3c, without an annular groove, are perfectly possible.

Figure 2:
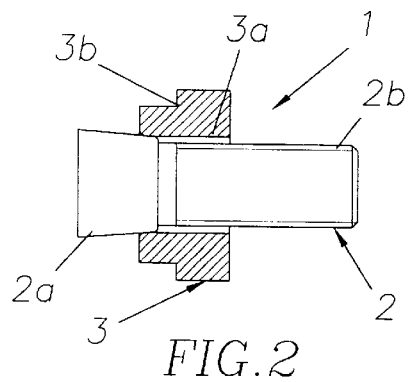
FIG. 2 corresponds to FIG. 1 with the two constitutive pieces assembled.
Figure 5:
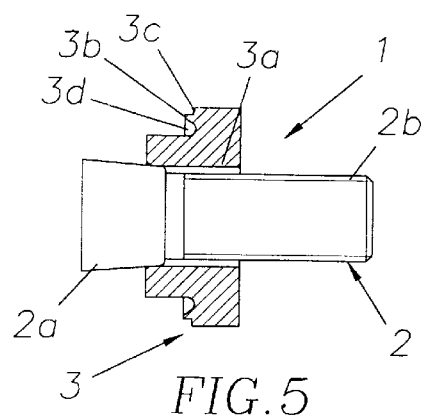

Before use, the insert 1 is in the form shown in FIGS. 2 and 5, i.e., the pin 2 is already introduced and slightly wedged into the ring 3, the truncated head 2a being introduced through its smallest diameter, corresponding substantially to the internal diameter of the bore 3a, in the ring 3 on the side opposite of the shoulders 3b, 3c of the ring.

Figure 3:
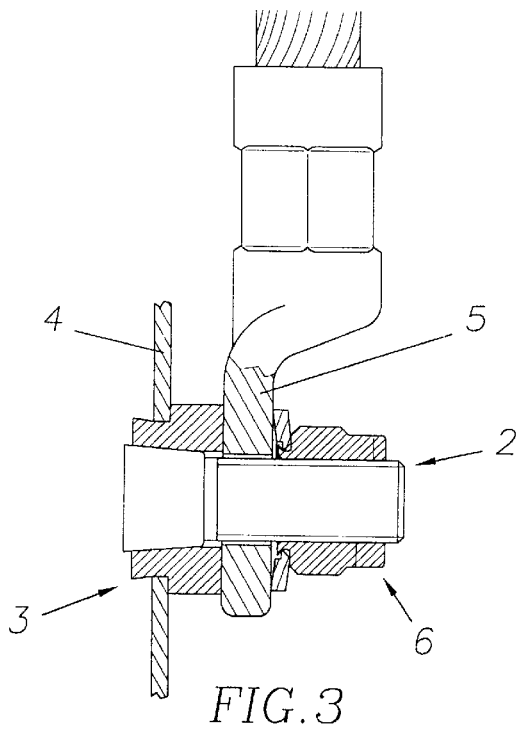
FIG. 3 shows the insert of FIGS. 1 and 2 positioned in a wall and to which is fixed an electric connector terminal.
Figure 4:
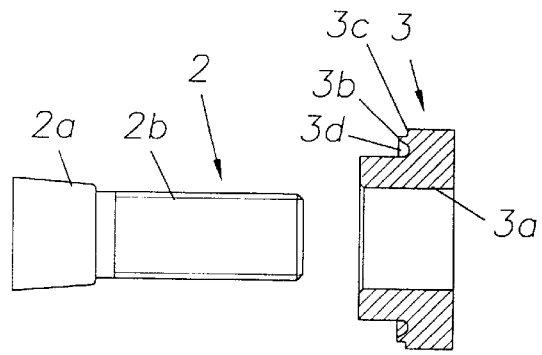
FIGS. 4, 5 and 6 correspond exactly to FIGS. 1, 2 and 3 respectively and show a slightly different embodiment.
Figure 6:
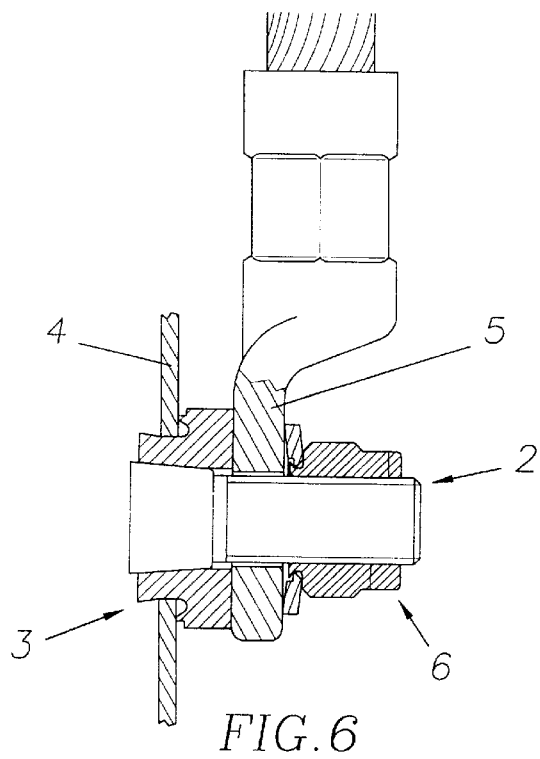

The insert shown in FIGS. 1,2 and 4,5 is adapted to be fixed to a thin wall 4 (FIGS. 3 and 6).

Figure 7:
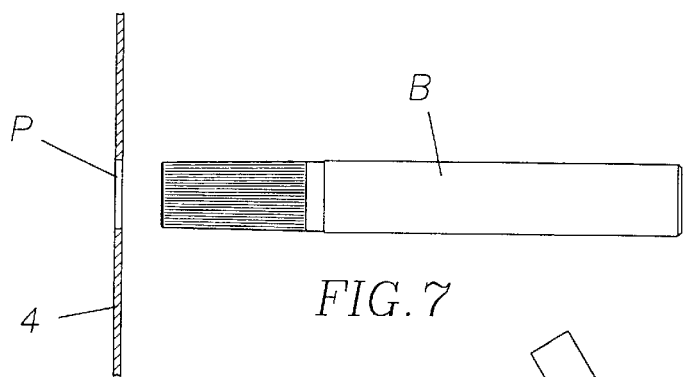
FIGS. 7–10 schematically show a preparatory step during the mounting of an insert according to the invention.
Figure 8:
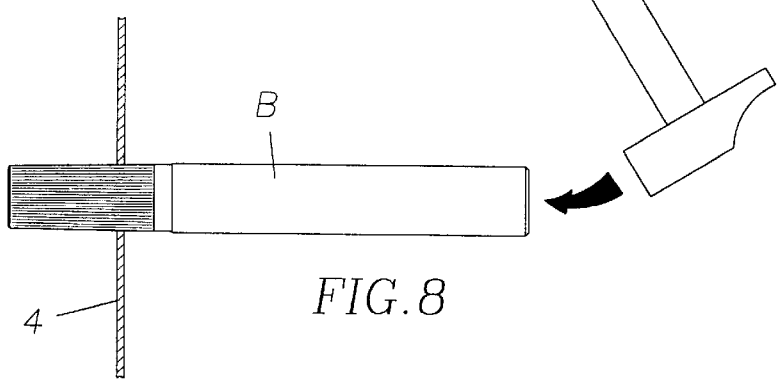
Figure 9:
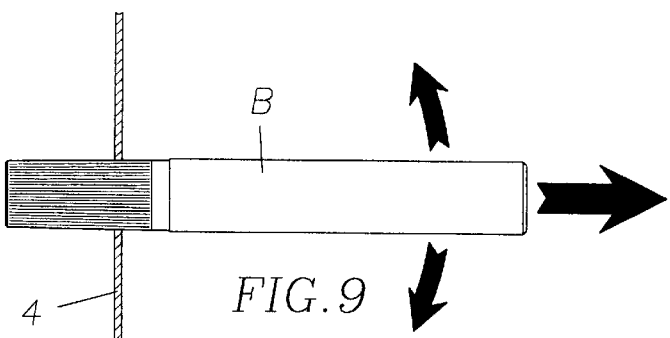
Figure 10:
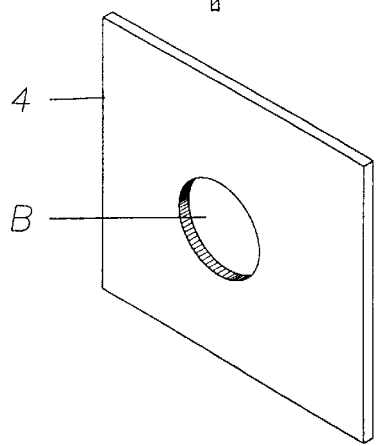

Primarily, the wall 4 is pierced or punched to form a bore P (FIGS. 7 and 10), the internal diameter thereof corresponding substantially to the external diameter of the ring 3 in its narrowest part.

Preferably, the internal peripheral surface of the aforementioned bore P is marked, for example, by way of a serrated stem B (FIGS. 7–10) so as to obtain a better bearing of the insert which is introduced into the bore, as shown in FIGS. 3–6, i.e., until the retaining shoulder 3b presses on the wall 4. As shown clearly in FIGS. 3 and 6, the longitudinal dimension of the ring, from its free end to its retaining shoulder 3b, is selected to be distinctly greater than the thickness of the wall 4, so as to extend well past the latter on the side of the truncated head 2a of the pin (for example, a value between 20% and several times the thickness of the wall).

Next, to fix and block the insert, it only takes a traction to exert on the threaded rod 2b of the pin to cause a diametrical expansion of the ring 3 during penetration of the pin.

The traction exerted on the threaded rod 2b is, for example, but not necessarily, obtained by utilizing of a hydraulic tool.

As clearly shown in the drawings, the expansion of the ring causes a flaring out of the part extending past the latter, and the external diameter of this extended part becomes distinctly greater than the diameter of the bore P, ensuring thereby a forced wedging and an excellent electrical contact between the ring 3 and the wall 4, an electrical contact that is improved also in that the peripheral internal surface of the bore is perfectly scraped due to the aforementioned action of the serrated stem B.

Also, as shown in FIGS. 3 and 6, an electric connector terminal 5 can then be easily fixed on the rod 2b of the pin by tightening, between the ring 3 and a nut 6, provided here with an elastic washer.

Such a terminal 5 is, for example, adapted to perform a grounding and, understandably, all of the surfaces ensure a perfect electrical contact, and a tightening of the nut 6 can only occur in the direction of the diametrical expansion of the ring 3.

If necessary, such an insert can be removed easily in spite of its expansion at the rear of the wall.

Figure 11:
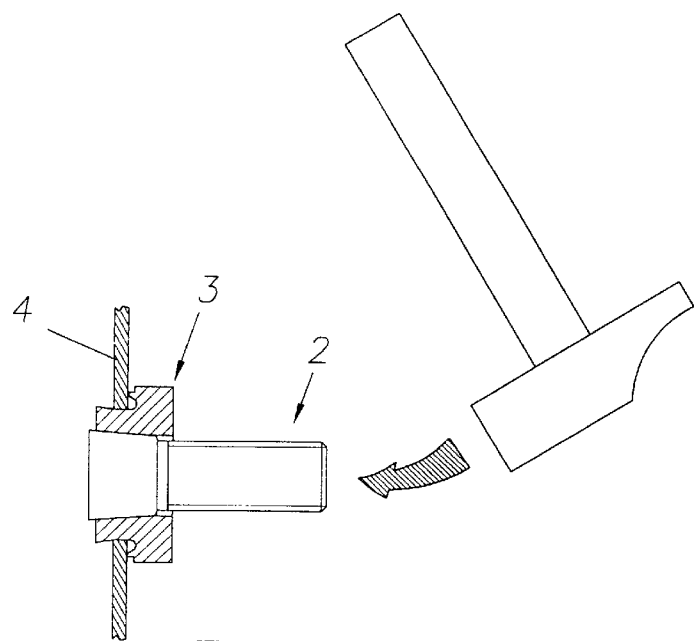
FIGS. 11, 12 and 13 schematically show three steps in dismounting an insert according to the invention and more specifically according to the embodiment of FIGS. 4, 5 and 6.

Indeed, it suffices, after unscrewing the nut 6 and removing the terminal 5, to remove the pin 2 from the ring 3 by striking on the end opposite its truncated head, as shown in FIG. 11.

Figure 12:
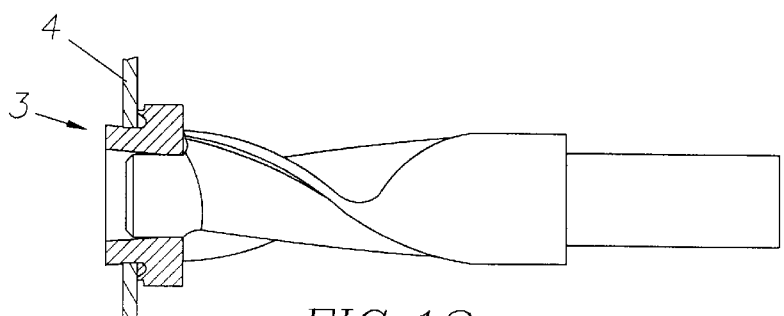
Figure 13:
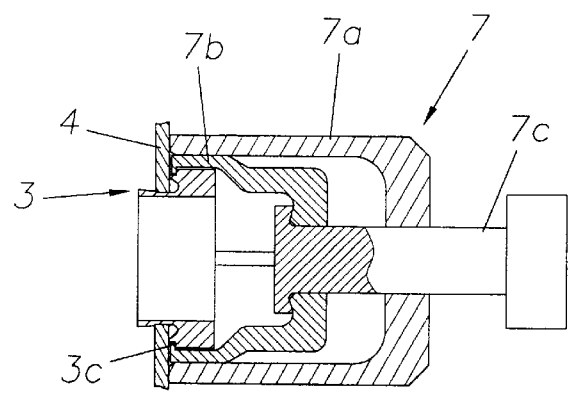

Next, and generally, the ring is drilled to increase its internal diameter as shown in FIG. 12, then the ring 3 is removed by way of, for example, a screwdriver or the like. However, for the embodiment of FIGS. 4–6, the ring 3 can be extracted by using a specific tool 7 (FIG. 13) which, on the one hand, takes support on the wall 4 through a stirrup 7a, while coming, on the other hand, into a gripping on the extracting shoulder 3c of the ring through an appropriate stirrup 7b which is driven by a traction mechanism 7c.

Other particularities can be envisioned without leaving the scope of the invention. Thus, the terminal 5 could be one single piece with the ring 3.

The instant application is based upon French priority patent application No. 97/06295, filed on May 23, 1997, the disclosure of which is hereby expressly incorporated by reference thereto, and the priority of which is hereby claimed under 35 USC 119.

What is claimed is:

1. An insert for fixing an electrical connector to a thin wall, said insert comprising:
   a metallic pin having a truncated conical head having a relatively smaller end and a relatively larger end, and a threaded extension extending from said smaller end of said conical head;
   a non-split metallic ring having a cylindrical interior bore of substantially constant diameter, said ring having at least one exterior retaining shoulder and a smaller circumferential portion extending from said retaining shoulder to a free end;
   said head of said pin being configured to be inserted into said interior bore of said ring at said free end of said ring, thereby forming a pin/ring assembly, whereas the pin/ring assembly is configured to be introduced into a bore of the thin wall and the electrical connector is adapted to be secured to said ring;
   said smaller circumferential portion of said ring having a length, from said free end to said external retaining shoulder, distinctly greater than a thickness of the wall by an amount between 20% and several times the thickness of the thin wall;
   wherein the amount of said smaller circumferential portion of said ring extending beyond said thin wall at said large end of said truncated conical head is deformable by flaring out as said head of said pin is inserted into said ring.

2. The insert according to claim 1, further comprising:
   a nut screwed onto said threaded extension of said pin, wherein said electrical connector is fixed between said ring and said nut.

3. The insert according to claim 1, wherein said ring further includes an extraction shoulder, ensuring a grip for a ring extraction tool, said retaining shoulder and said extraction shoulder constituting a stepped double shoulder of said ring.

4. The insert according to claim 1, wherein said retaining shoulder extends circumferentially around said ring and projects longitudinally along said ring a predetermined amount in a direction toward said free end of said ring; and
   said ring further includes an extraction shoulder positioned circumferentially outside of said retaining shoulder, said extraction shoulder extending circumferentially around said ring and projecting longitudinally along said ring less than said predetermined amount to thereby provide a gripping surface for a ring extraction tool.

5. The insert according to claim 1, wherein said retaining shoulder of said ring further includes an annular groove provided in an area of connection with an external surface of said ring.

6. The insert according to claim 1, wherein said pin is made of stainless steel and said ring is made of tinned copper.

7. The insert according to claim 1, wherein said pin and said ring are assembled together before use.

8. An insert and an electrical connector fixed to a thin wall, said insert and electrical connector comprising:
   a metallic pin having a truncated conical head having a relatively smaller end and a relatively larger end, and a threaded extension extending from said smaller end of said conical head;
   a non-split metallic ring having an initially cylindrical interior bore of substantially constant diameter, said ring having at least one exterior retaining shoulder and a smaller circumferential portion extending from said retaining shoulder to a free end;
   said head of said pin inserted into said interior bore of said ring at said free end of said ring, thereby forming a pin/ring assembly, said assembly being inserted into a bore of a thin wall;
   a member securing said electrical connector to said ring;
   said smaller circumferential portion of said ring having a length, from said free end to said retaining shoulder, distinctly greater than a thickness of the thin wall by an amount between 20% and several times the thickness of the thin wall;
   wherein the amount of said smaller circumferential portion of said ring extending beyond said thin wall at said large end of said truncated conical head flares radially outwardly when the truncated conical head moves into the interior bore of the ring.

9. The insert and connector according to claim 8, wherein said member securing said electrical connector to said ring comprises a nut screwed onto said threaded extension of said pin; and
   said electrical connector is fixed between said ring and said nut.

10. The insert and connector according to claim 8, wherein said ring further includes an extraction shoulder, ensuring a grip for a ring extraction tool, said retaining shoulder and said extraction shoulder constituting a stepped double shoulder of said ring.

11. The insert and connector according to claim 8, wherein said retaining shoulder extends circumferentially around said ring and projects longitudinally along said ring a predetermined amount in a direction toward said free end of said ring; and
   said ring further includes an extraction shoulder positioned circumferentially outside of said retaining shoulder, said extraction shoulder extending circumferentially around said ring and projecting longitudinally along said ring less than said predetermined amount to thereby provide a gripping surface for a ring extraction tool.

12. The insert and connector according to claim 8, wherein said retaining shoulder of said ring further includes an annular groove provided in an area of connection with an external surface of said ring.

13. The insert and connector according to claim 8, wherein said pin is made of stainless steel and said ring is made of tinned copper.

14. The insert and connector according to claim 8, wherein said pin and said ring are assembled together before use.

15. An insert for fixing an electrical connector to a thin wall, the insert comprising:
   a metallic pin having a truncated conical head having a relatively smaller end and a relatively larger end, and a threaded extension extending from said smaller end of said conical head;
   a non-split metallic ring having a cylindrical interior bore of substantially constant diameter, said ring having at least one exterior retaining shoulder and a smaller circumferential portion extending from said retaining shoulder to a free end;
   said ring further including an extraction shoulder, ensuring a grip for a ring extraction tool, said retaining shoulder and said extraction shoulder constituting a stepped double shoulder of said ring;
   said head of said pin being configured to be inserted into said interior bore of said ring at said free end of said ring, thereby forming a pin/ring assembly, whereas the pin/ring assembly is configured to be introduced into a bore of a thin wall and the electrical connector is adapted to be secured to said ring;
   said smaller circumferential portion of said ring having a length, from said free end to said external retaining shoulder, distinctly greater than a thickness of a thin wall, wherein the amount of said smaller circumferential portion of said ring extending beyond a thin wall at said large end of said truncated conical head is deformable by flaring out as said head of said pin is inserted into said ring; and
   a nut screwed onto said threaded extension of said pin, wherein said electrical connector is fixed between said ring and said nut.

16. An electrical connection between an electrical connector having an insert and a thin wall wherein the insert fixes an electrical connector to the thin wall, the connection comprising:
   a metallic pin having a truncated conical head having a relatively smaller end and a relatively larger end, and a threaded extension extending from said smaller end of said conical head;
   a non-split metallic ring having a cylindrical interior bore of substantially constant diameter, said ring having at least one exterior retaining shoulder and a smaller circumferential portion extending from said retaining shoulder to a free end;
   said head of said pin being configured to be inserted into said interior bore of said ring at said free end of said ring, thereby forming a pin/ring assembly, whereas the pin/ring assembly is configured to be introduced into a bore of the thin wall and the electrical connector is adapted to be secured to said ring;
   said smaller circumferential portion of said ring having a length, from said free end to said external retaining shoulder, distinctly greater than a thickness of the thin wall by an amount between 20% and several times the thickness of the thin wall, wherein the amount of said smaller circumferential portion of said ring extending beyond said thin wall at said large end of said truncated conical head is deformable by flaring out as said head of said pin is inserted into said ring; and
   a nut screwed onto said threaded extension of said pin, wherein said electrical connector is fixed between said ring and said nut.

* * * * *